United States Patent
Qin et al.

(10) Patent No.: US 8,765,888 B2
(45) Date of Patent: Jul. 1, 2014

(54) POLYMERS FUNCTIONALIZED WITH HYDROXYL GROUP-CONTAINING DIPHENYLETHYLENE

(75) Inventors: Zengquan Qin, Copley, OH (US); Yuan-Yong Yan, Copley, OH (US); Xiao-Dong Pan, Akron, OH (US)

(73) Assignee: Bridgestone Corporation, Tokyo (JP)

( * ) Notice: Subject to any disclaimer, the term of this patent is extended or adjusted under 35 U.S.C. 154(b) by 28 days.

(21) Appl. No.: 13/381,345

(22) PCT Filed: Jun. 30, 2010

(86) PCT No.: PCT/US2010/040515
§ 371 (c)(1),
(2), (4) Date: Feb. 8, 2012

(87) PCT Pub. No.: WO2011/002830
PCT Pub. Date: Jan. 6, 2011

(65) Prior Publication Data
US 2012/0130009 A1    May 24, 2012

Related U.S. Application Data

(60) Provisional application No. 61/222,095, filed on Jun. 30, 2009.

(51) Int. Cl.
*C08F 4/48* (2006.01)
*C08F 4/46* (2006.01)

(52) U.S. Cl.
USPC ............ 526/173; 526/183; 526/178; 526/181

(58) Field of Classification Search
USPC .................................. 526/178, 181, 183, 273
See application file for complete search history.

(56) References Cited

U.S. PATENT DOCUMENTS

| | | | |
|---|---|---|---|
| 4,196,153 A | 4/1980 | Tung et al. | |
| 4,201,729 A | 5/1980 | Tung et al. | |
| 4,975,491 A * | 12/1990 | Quirk | 525/288 |
| 5,081,191 A | 1/1992 | Quirk | |
| 5,153,291 A | 10/1992 | Leitz et al. | |
| 5,676,833 A | 10/1997 | Odaka et al. | |
| 5,780,551 A | 7/1998 | Engel et al. | |
| 6,716,935 B1 | 4/2004 | Nelson et al. | |
| 6,765,065 B2 * | 7/2004 | Oshima et al. | 525/272 |
| 6,818,710 B2 | 11/2004 | Oshima et al. | |
| 7,056,985 B2 | 6/2006 | Faust et al. | |
| 7,208,171 B2 | 4/2007 | Messersmith et al. | |
| 7,342,046 B2 | 3/2008 | Wang et al. | |
| 8,440,755 B2 | 5/2013 | Qin et al. | |
| 2005/0201974 A1 | 9/2005 | Schestopol et al. | |
| 2005/0288398 A1 | 12/2005 | Messersmith et al. | |
| 2010/0286348 A1 | 11/2010 | Pan et al. | |
| 2012/0136091 A1 | 5/2012 | Yan et al. | |
| 2012/0136128 A1 | 5/2012 | Yan et al. | |
| 2013/0035437 A1 | 2/2013 | Pan et al. | |

FOREIGN PATENT DOCUMENTS

WO    2007014998    2/2007

OTHER PUBLICATIONS

Dhara, Mahua et al, "Synthesis of Amphiphilic Poly(methyl methacrylate-b-ethylene oxide) Copolymers form Monohydroxy Telechelic Poly(methyl methacrylate) as Macroinitiator", 2008, Journal of Polymer Science: Part A: Polymer Chemistry, vol. 46, 2132-2144.*
Hirao, Akira et al., "Synthesis of well-defined functionalized polymers and star branched polymers by means of living anionic polymerization using specially designed 1,1-diphenylethylene derivanives," Macromol. Rapid Commun., vol. 21, Issue 17, pp. 1171-1184 (2000).
Hirao, Akira et al., "Precise syntheses of chain-multi-functionalized polymers, star-branched polymers, star-linear block polymers, densely branched polymers, and dendritic branched polymers based on iterative approach using functionalized 1,1-diphenylethylene derivatives," Progress in Polymer Science, vol. 30, Issue 2, pp. 111-182 (2005).
Jagur-Grodzonski, Joseph, "Functional polymers by living anionic polymerization," Journal of Polymer Science Part A: Polymer Chemistry, vol. 40, Issue 13, pp. 2116-2133 (2002).
Kim, Seon ah, International Search Report with Written Opinion from PCT/US10/40515, 10 pp. (Feb. 28, 2011).
Yu, Miaoer et al., "Role of 1-3,4-Dihydroxyphenylalanine in Mussel Adhesive Proteins," Journal of the American Chemical Society, vol. 121, Issue 24, pp. 5825-5826 (1999).
Office action, dated Nov. 12, 2013, from SIPO in CN 201080038725.X (6 pp., plus 9-page translation).
Extended search report, dated Nov. 22, 2012, from the EPO in EP 10794675.8 (6 pp.).
Office action, dated Apr. 7, 2013, from SIPO in CN 201080038725.X (9 pp., plus 7-page translation).

* cited by examiner

*Primary Examiner* — Ling Choi
*Assistant Examiner* — David L Miller
(74) *Attorney, Agent, or Firm* — Meredith E. Hooker; David G. Burleson

(57) ABSTRACT

Vulcanizates with desirable properties can be obtained from compounds incorporating polymers that include hydroxyl group-containing diphenylethylene-type functionalities. The functionalities can be incorporated by using any or all of appropriate initiators, monomers and optional terminating compounds. Such polymers exhibit excellent interactivity with both conventional and non-conventional fillers.

15 Claims, No Drawings

POLYMERS FUNCTIONALIZED WITH HYDROXYL GROUP-CONTAINING DIPHENYLETHYLENE

CROSS-REFERENCE TO RELATED APPLICATIONS

This is a national stage filing under 35 U.S.C. §371 of international application no. PCT/US2010/040515, filed 30 Jun. 2010, which claimed priority to and the benefit of U.S. provisional patent appl. No. 61/222,095, filed 30 Jun. 2009.

BACKGROUND INFORMATION

Good traction and resistance to abrasion are primary considerations for tire treads; however, motor vehicle fuel efficiency concerns argue for a minimization in their rolling resistance, which correlates with a reduction in hysteresis and heat build-up during operation of the tire. These considerations are, to a great extent, competing and somewhat contradictory: treads made from compositions designed to provide good road traction usually exhibit increased rolling resistance and vice versa. Tread compositions typically contain one or more elastomers and one or more types of reinforcing materials such as particulate carbon black and silica; see, e.g., *The Vanderbilt Rubber Handbook*, 13th ed. (1990), pp. 603-04.

Filler(s), polymer(s), and additives typically are chosen so as to provide an acceptable compromise or balance of the desired properties. Ensuring that reinforcing filler(s) are well dispersed throughout the elastomeric material(s) both enhances processability and acts to improve physical properties. Dispersion of filler particles can be improved by increasing their interaction with the elastomer(s) and/or decreasing their interaction with each other. Examples of efforts of this type include high temperature mixing in the presence of selectively reactive promoters, surface oxidation of compounding materials, surface grafting, and chemically modifying the polymer, typically at a terminus thereof.

Terminal chemical modification often occurs by reaction of a living (i.e., anionically initiated) polymer with a functional terminating agent. Some of the numerous examples of this approach include U.S. Pat. Nos. 3,109,871, 4,647,625, 4,677,153, 5,109,907, 6,977,281, etc., as well as references cited therein and later publications citing these patents.

Many of the polymers used in the manufacture of vulcanizates such as, e.g., tire components, are elastomeric. In addition to natural rubber, some of the most commonly employed include high-cis polybutadiene, often made by processes employing Ziegler-Natta catalysts, and substantially random styrene/butadiene interpolymers, often made by processes employing anionic initiators. Chemical modifications that can be undertaken with carbanionic polymers often do not work for polymers made via catalytic processes.

The reaction of a carbanionic polymer with 1,1-diphenylethylene is essentially quantitative, resulting in a new carbanionic species that can act to initiate polymerization of other (added) appropriate vinyl monomers such as, for example, dienes, certain vinyl and cyclic monomers (as well as mixtures thereof) and even polar ethylenically unsaturated compounds like acrylates.

SUMMARY

In a first general aspect is provided a functionalized polymer that includes polyene mer and at least one unit having the general formula

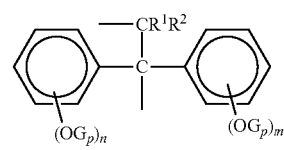

(I)

where each $G_p$ independently is a protecting group, each of $R^1$ and $R^2$ independently is a hydrogen atom or a hydrocarbyl group, m is an integer of from 1 to 5 inclusive, and n is an integer of from 0 to 5 inclusive. The unit(s) can be incorporated along the polymer chain, in which case each such unit is bonded to two other mer units (either the same or different types), or such a unit can be located at a terminus of the polymer chain.

In situations involving polymers with active terminals, a formula I-type unit can be incorporated at either end of the chain. Where the unit is incorporated at the end of polymerization (i.e., the terminating end), the polymer can have the general formula

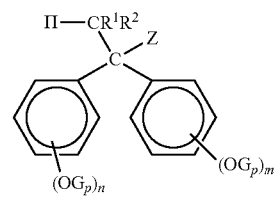

(II)

where π is a polymer that includes polyene mer; each of $G_p$, $R^1$, $R^2$, m and n are defined as above; and Z can be a hydrogen atom or the radical of a terminating compound. Where a carbanionic polymer is reacted with a compound having the general formula

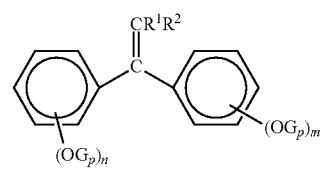

(III)

a formula II polymer can be provided by quenching, which results in Z being H, or by reaction with a terminating compound, which results in Z being the radical of terminating compound. Alternatively, a formula III compound can be reacted with a hydrocarbyl alkali metal compound so as to provide an ionic compound having the general formula

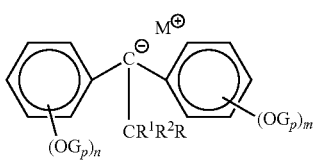

(IV)

where M is an alkali metal atom and R is a hydrocarbyl group such as alkyl, cycloalkyl, aryl, etc.; a formula IV compound can be used to initiate polymerization of any of a variety of ethylenically unsaturated mer, which results in incorporation of the formula I unit at the beginning of polymerization (i.e., the initiating end of the polymer) so that chain propagation begins from the anionic carbon atom of formula IV.

In other aspects are provided methods of making formula IV compounds, methods of using formula IV compounds to initiate polymerization of ethylenically unsaturated monomers, methods of making formula II-type polymers, and methods of providing and using polymers containing formula I units.

In any of the foregoing aspects, the protecting group(s) can be replaced, typically via hydrolysis, with hydrogen atoms so as to provide one or more hydroxyl substituents directly bonded to one or both of the phenyl groups. This can result in m (defined above) hydroxyl substituents being directly bonded to one phenyl group and n (defined above) hydroxyl substituents to the other.

The carbanionic polymer can be provided by anionically initiating polymerization of ethylenically unsaturated monomers, which typically include one or more types of polyenes, particularly conjugated dienes, and optionally at least one type of vinyl aromatic compound. The resulting polymer can include multiple mer resulting from incorporation of alkenes (A units), and one or more non-adjacent mer defined by general formula I (B units). In any or each of these aspects, the polymer can include optional, directly bonded aromatic pendent groups (C units), can be substantially linear, and/or can include unsaturation within and/or pendent from the polymer chain. This unsaturation can result from incorporation of polyene mer units and preferably is substantially random along the polymer chain.

Further, incorporation of a B unit into a polymer chain permits formation of blocks of subsequent mer that otherwise would be difficult or impossible to incorporate via anionic polymerization techniques.

Regardless of how characterized, the polymer can interact with particulate filler such as, e.g., carbon black and silica. Compositions, including vulcanizates, that include particulate fillers and such polymers also are provided, as are methods of providing and using such compositions.

Other aspects of the invention will be apparent to the ordinarily skilled artisan from the description of illustrative embodiments that follows. To assist in understanding the following description of various embodiments, certain definitions are provided immediately below. These are intended to apply throughout unless the surrounding text explicitly indicates a contrary intention:

"polymer" means the polymerization product of one or more monomers and is inclusive of homo-, co-, ter-, tetra-polymers, etc.;

"mer" or "mer unit" means that portion of a polymer derived from a single reactant molecule (e.g., ethylene mer has the general formula —$CH_2CH_2$—);

"copolymer" means a polymer that includes mer units derived from two reactants, typically monomers, and is inclusive of random, block, segmented, graft, etc., copolymers;

"interpolymer" means a polymer that includes mer units derived from at least two reactants, typically monomers, and is inclusive of copolymers, terpolymers, tetrapolymers, and the like;

"random interpolymer" means an interpolymer having mer units derived from each type of constituent monomer incorporated in an essentially non-repeating manner and being substantially free of blocks, i.e., segments of three or more of the same mer;

"carbanionic" and "living" are used interchangeably;

"gum Mooney viscosity" is the Mooney viscosity of an uncured polymer prior to addition of any filler(s);

"compound Mooney viscosity" is the Mooney viscosity of a composition that includes, inter alia, an uncured or partially cured polymer and particulate filler(s);

"substituted" means one containing a heteroatom or functionality (e.g., hydrocarbyl group) that does not interfere with the intended purpose of the group in question;

"directly bonded" means covalently attached with no intervening or interposed atoms or groups;

"polyene" means a molecule with at least two double bonds located in the longest portion or chain thereof, and specifically is inclusive of dienes, trienes, and the like;

"polydiene" means a polymer that includes mer units from one or more dienes;

"phr" means parts by weight (pbw) per 100 pbw rubber;

"protecting group" means a group that (1) is sufficiently reactive toward the oxygen atom of a hydroxyl functionality that, under a first set of reaction conditions, it can replace the H atom of that group, (2) is non-reactive toward carbanionic polymers and the initiators used to provide them, and, optionally, (3) can be replaced by a H atom under a second set of reaction conditions which differ from the first set;

"radical" means the portion of a molecule that remains after reacting with another molecule, regardless of whether any atoms are gained or lost as a result of the reaction;

"terminus" means an end of a polymeric chain; and

"terminal moiety" means a group or functionality located at a terminus.

All values herein in the form of percentages are weight percentages unless the surrounding text explicitly indicates a contrary intention.

DESCRIPTION OF ILLUSTRATIVE EMBODIMENTS

As apparent from the foregoing Summary, the functionalized polymer can be characterized in a variety of ways. Generally, it includes mer derived from one or more polyenes, particularly dienes, and terminal functionality and/or one or more mer units resulting from (directly or indirectly) incorporation of a formula III compound. In at least certain embodiments, the polymer also can include directly bonded pendent aromatic groups.

A polymer having a B unit can be provided by reacting a formula III compound with a polymer having an active chain end, either during or at the conclusion of chain propagation. Alternatively or additionally, a formula III compound can be reacted with a hydrocarbyl alkali metal compound so as to provide an ionic compound capable of initiating polymerization of ethylenically unsaturated monomers, i.e., a formula IV initiator. Accordingly, one or more B units can be located along the polymer chain, a B unit can located at a terminus, and/or a radical of a formula IV initiator can be located at a terminus. Where a B unit is located at a polymer chain terminus, the result is a formula II-type functionalized polymer with the identity of Z depending on whether the polymer is subjected to further functionalization.

The following describes the production and use of a polymer that includes multiple A mer, i.e., alkene units; optionally, multiple C mer, i.e., units that include a pendent aryl group, particularly a phenyl group, and, where at least some of the desired functionalization is to be derived from functional monomers, at least one B mer. Each of the A, B and C mer can result from incorporation of ethylenically unsaturated monomers.

The A mer typically result from incorporation of polyenes, particularly trienes (e.g., myrcene) and dienes, particularly $C_4$-$C_{12}$ dienes and even more particularly conjugated dienes such as 1,3-butadiene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, isoprene, 4-methyl-1,3-pentadiene, 2,4-hexadiene, and the like. Some or all of the A mer can be derived from one or more types of dienes, particularly conjugated dienes, e.g., 1,3-butadiene. In some embodiments, essentially all (i.e., at least 95%) of the polyenes can be dienes, particularly conjugated dienes. Such polymers typically display elastomeric characteristics.

Polyenes can incorporate into polymeric chains in more than one way. Especially for tire tread applications, controlling this manner of incorporation can be desirable. A polymer chain with an overall 1,2-microstructure, given as a numerical percentage based on total number of polyene units, of from ~10 to ~80%, optionally from ~25 to ~65%, can be desirable for certain end use applications. A polymer that has an overall 1,2-microstructure of no more than ~50%, preferably no more than ~45%, more preferably no more than ~40%, even more preferably no more than ~35%, and most preferably no more than ~30%, based on total polyene content, is considered to be substantially linear. For certain end use applications, keeping the content of 1,2-linkages even lower, e.g., to less than about 7%, less than 5%, less than 2%, or less than 1%, can be desirable.

Depending on the intended end use, one or more of the polymer chains can include pendent aromatic groups, which can be provided by C mer, i.e., mer derived from vinyl aromatics, particularly the $C_8$-$C_{20}$ vinyl aromatics such as, e.g., styrene, α-methyl styrene, p-methyl styrene, the vinyl toluenes, and the vinyl naphthalenes. When used in conjunction with one or more polyenes, C mer can constitute from ~1 to ~50%, from ~10 to ~45%, or from ~20 to ~40% of the polymer chain; random microstructure can provide particular benefit in some end use applications such as, e.g., rubber compositions used in the manufacture of tire treads. Where a block interpolymer is desired, C units can constitute from ~1 to ~90%, generally from ~2 to ~80%, commonly from ~3 to ~75%, and typically ~5 to ~70% of the polymer chain. (In this paragraph, all percentages are mole percentages.)

Exemplary interpolymers include those in which one or more conjugated dienes are used to provide the A units, i.e., polydienes; among these, 1,3-butadiene can be one of several or the only polydiene employed. Where C units are desired, they can be provided from styrene so as to provide, for example, SBR. In each of the foregoing types of exemplary interpolymers, one or more B units also can be incorporated.

B units, generally defined by formula I, include two pendent phenyl groups, at least one of which includes one or more directly bonded hydroxyl groups. Because the H atoms of hydroxyl groups are active and can interfere with certain polymerization processes, the one or more B units typically are provided from compounds that include protecting groups, identified above as $G_p$. Although each $G_p$ moiety need not be identical, ease and simplicity typically result in a single type of $G_p$ moiety for a given compound.

Unless a particular $G_p$ constitutes a moiety that is capable of enhancing the polymer's interactivity with particulate filler (as evidenced by, for example, reduced tan δ values at 50° C.), it preferably also is capable of being hydrolyzed by a process that does not destroy or otherwise react with ethylenic unsaturation in the polymer resulting from the presence of A units. Trihydrocarbylsilyl groups are a non-limiting example of the type of $G_p$ moiety that can serve these dual purposes; such moieties can be provided by reacting the hydroxyl substituent(s) of the phenyl group with a trihydrocarbylsilyl halide, preferably a trialkylsilyl halide. In addition to trihydrocarbylsilyl moieties, other potentially useful $G_p$ moieties include but not limited to benzyl, t-butyl, alkoxyalkyl (e.g., $CH_3OCH_2$—), tetrahydropyranyl, allyl, sulfonamide, and bulky esters (e.g., pivalates).

One or both of the phenyl groups in a single B unit includes one or more $OG_p$ moieties. The number of $OG_p$ moieties on each phenyl group of a B unit need not be the same and, where the number is the same, the $OG_p$ moieties need not be at the same position(s) on the two rings. Relative to the point of attachment of the phenyl group to the polymer chain, a single $OG_p$ moiety can be located ortho, meta, or para on the phenyl ring, while multiple $OG_p$ moieties can be provided 2,3-, 2,4-, 2,5-, 2,6-, 3,4-, 3,5-, 3,6-, 2,3,4-, 2,3,5-, etc., on the phenyl ring. Additionally, where a polymer includes more than one B unit, each unit can have different numbers of $OG_p$ moieties and/or have $OG_p$ moieties at different positions on their phenyl groups.

B units typically are provided from formula III compounds in which m is an integer of from 1 to 5 inclusive and n is an integer of from 0 to 5 inclusive, i.e., a diphenylethylene compound in which at least one of the phenyl groups includes at least one $OG_p$ moiety. One phenyl group includes up to five such $OG_p$ moieties, while the other phenyl group optionally also includes up to 5 such $OG_p$ moieties. In one embodiment, two $OG_p$ moieties can be bonded to adjacent ring C atoms, e.g., at the 3 and 4 positions, of the same phenyl group.

In formula III, each of $R^1$ and $R^2$ independently represents a hydrogen atom or a hydrocarbyl group, particularly a hydrocarbyl group that is free of ethylenic unsaturation. Exemplary $R^1$ and $R^2$ groups include hydrogen atoms, alkyl groups (particularly lower alkyl groups, e.g., $C_1$-$C_6$ alkyl groups), cycloalkyl groups and aromatic groups. In certain embodiments, both $R^1$ and $R^2$ can be hydrogen atoms.

When one or more formula III-type compounds is polymerized, it/they provide the B unit(s). The number of B units typically is small relative to the number of A units and, if present, C units; a relatively small number of B units has been found to provide a satisfactory level of desired properties, with further improvements in those properties not necessarily being proportional to the number of B units present. This relatively small number can be expressed in a number of ways. For example, the weight percentage of the final polymer attributable to B units commonly is less than 2%, more commonly from ~0.1 to ~1.5%, and typically from ~0.2 to ~1.0%. The percentage of B mer relative to the total number of mer in the polymer commonly is less than 1%, more commonly from ~0.01 to ~0.75%, and typically from ~0.05 to ~0.5%. The total number of B units in a given polymer generally is from 1 to several dozen, commonly from 1 to 12, more commonly from 1 to 10, and most commonly from 1 to 5.

The B unit(s) can incorporated near the beginning of the polymerization, near the end of the polymerization, or at any one or more intermediate points; in the first two of the foregoing possibilities, a B unit can be provided within 6 chain atoms of, within 2 units of, adjacent to a terminus of the polymer, or as a terminal unit. Where more than one B unit is present, they are separated from one another, i.e., not contiguous.

The foregoing types of polymers can be made by emulsion polymerization or solution polymerization, with the latter affording greater control with respect to such properties as randomness, microstructure, etc. Solution polymerizations have been performed for many decades, so the general aspects thereof are known to the ordinarily skilled artisan, so only certain general aspects are provided here for convenience of reference.

Both polar solvents, such as THF, and non-polar solvents can be employed in solution polymerizations, with the latter type being more common in industrial practice. Examples of non-polar solvents include various $C_5$-$C_{12}$ cyclic and acyclic alkanes as well as their alkylated derivatives, certain liquid aromatic compounds, and mixtures thereof. The ordinarily skilled artisan is aware of other useful solvent options and combinations.

Depending on the nature of the polymer desired, the particular conditions of the solution polymerization can vary significantly. The following description is of an anionic polymerization, although cationic polymerizations also are possible. After these descriptions, optional functionalization and processing of polymers so made are discussed.

Anionic polymerization typically involves an initiator as opposed to, e.g., a catalyst. Exemplary initiators include organolithium compounds, particularly alkyllithium compounds. Examples of organolithium initiators include N-lithio-hexamethyleneimine; n-butyllithium; tributyltin lithium; dialkylaminolithium compounds such as dimethylaminolithium, diethylaminolithium, dipropylaminolithium, dibutylaminolithium and the like; dialkylaminoalkyllithium compounds such as diethylaminopropyllithium; and those trialkylstanyl lithium compounds involving $C_1$-$C_{12}$, preferably $C_1$-$C_4$, alkyl groups.

Multifunctional initiators, i.e., initiators capable of forming polymers with more than one living end, also can be used. Examples of multifunctional initiators include, but are not limited to, 1,4-dilithiobutane, 1,10-dilithiodecane, 1,20-dilithioeicosane, 1,4-dilithiobenzene, 1,4-dilithionaphthalene, 1,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, and 4,4'-dilithiobiphenyl.

In addition to organolithium initiators, so-called functionalized initiators also can be useful. These become incorporated into the polymer chain, thus providing a functional group at the initiated end of the chain. Examples of such materials include lithiated aryl thioacetals (see, e.g., U.S. Pat. No. 7,153,919) and the reaction products of organolithium compounds and, for example, N-containing organic compounds such as substituted aldimines, ketimines, secondary amines, etc., optionally pre-reacted with a compound such as diisopropenyl benzene (see, e.g., U.S. Pat. Nos. 5,153,159 and 5,567,815); as well as hydroxyaryl-containing initiators such as those described in WO 2009/086490.

In addition to the foregoing, formula IV compounds can be used as initiators. Such compounds can be provided by reacting a formula III compound with a hydrocarbyl alkali metal compound such as, particularly, an organolithium compound of the type described previously. In the formula III compound (and, accordingly, in formula IV initiators), m can be an integer of from 1 to 5 inclusive while n can be an integer of from 0 to 5 inclusive, i.e., a diphenylethylene compound in which at least one of the phenyl groups includes at least one $OG_p$ moiety. In one embodiment, two $OG_p$ moieties can be bonded to adjacent ring C atoms, e.g., at the 3 and 4 positions, of the same phenyl group of a formula IV initiator. As mentioned previously, M in formula IV initiators can be an alkali metal atom, preferably a K, Na or Li atom, most preferably a Li atom.

The identity and treatment of $G_p$ moieties of the $OG_p$ functionalities in a formula IV initiator, as well as the $R^1$ and $R^2$ groups, are the same as those discussed above in connection with monomeric B units.

When a formula IV initiator initiates polymerization, its radical forms one end of a polymer chain. The $G_p$ moieties of this radical subsequently can be hydrolyzed so as to provide hydroxyl substituents.

A formula IV-type initiator can be made external to the polymerization vessel where it is to act as an initiator, in which case a blend of monomer(s) and solvent can be charged to the reaction vessel, followed by addition of initiator which often is added as part of a solution or blend (i.e., in a solvent carrier). For reasons of convenience, the formula (IV)-type often is synthesized in situ, described in detail below.

Although the ordinarily skilled artisan understands the conditions typically employed in solution polymerization, a representative description is provided for ease of reference. The following is based on a batch process, although the ordinarily skilled artisan can adapt this description to semi-batch, continuous, or other processes.

Solution polymerization typically begins by charging a blend of monomer(s) and solvent to a suitable reaction vessel, followed by addition of a coordinator (if used) and initiator, which often are added as part of a solution or blend; alternatively, monomer(s) and coordinator can be added to the initiator. Both randomization and vinyl content (i.e., 1,2-microstructure) can be increased through inclusion of a coordinator, usually a polar compound. Up to 90 or more equivalents of coordinator can be used per equivalent of initiator, with the amount depending on, for example, the amount of vinyl content desired, the level of non-polyene monomer employed, the reaction temperature, and nature of the specific coordinator employed. Compounds useful as coordinators include organic compounds that include a heteroatom having a non-bonded pair of electrons (e.g., O or N). Examples include dialkyl ethers of mono- and oligo-alkylene glycols; crown ethers; tertiary amines such as tetramethylethylene diamine; THF; THF oligomers; linear and cyclic oligomeric oxolanyl alkanes (see, e.g., U.S. Pat. No. 4,429,091) such as 2,2'-di(tetrahydrofuryl) propane, di-piperidyl ethane, hexamethylphosphoramide, N,N'-dimethylpiperazine, diazabicyclooctane, diethyl ether, tributylamine, and the like.

Typically, a solution of polymerization solvent(s) and the monomer(s) is provided at a temperature of from about −80° to +100° C., more commonly from about −40° to +50° C., and typically from ~0° to +30° C.; to this solution is added an initiating compound or, where a functionalizing unit is to be provided from the initiator, and the formula IV initiator (or a formula III precursor with an organolithium, typically an alkyllithium). The solution can have a temperature of from about −70° to ~150° C., more commonly from about −20° to ~120° C., and typically from ~10° to ~100° C. The polymerization is allowed to proceed under anhydrous, anaerobic conditions for a period of time sufficient to result in the formation of the desired polymer, usually from ~0.01 to ~100 hours, more commonly from ~0.08 to ~48 hours, and typically from ~0.15 to ~2 hours.

Advantageously, addition of formula III compounds after substantial depletion of other types of monomers can result in a carbanionic polymer that is relatively stable. This stable but active carbanion can undergo additional types of reaction that are difficult or impossible to do with carbanionic polymers that include only A or A and C units.

For example, once a B unit is added to a polymer chain, one to several hundred mer derived from any of a variety of anionically polymerizable ethylenically unsaturated compounds can be added; examples of ethylenically compounds that can be added in this manner include, but are not limited to, alkyl (meth)acrylates and even, in certain circumstances, vinyl aromatics. The additional monomers can add in a statistical (random) fashion or as a block. Additional information on this type of alternative chain propagation technique can be found in a variety of sources including, e.g., U.S. Pat. No. 7,279,527.

Additionally, an added B unit can react quantitatively with carbon dioxide so as to provide a carboxylation to the polymer chain. This type of reaction can be performed in a variety of ways such as introduction of gaseous $CO_2$ into the polymerization vessel (see, e.g., U.S. Pat. No. 5,077,346, for representative temperatures and pressures), transfer of polymer cement to a carbonated solution, and the like.

After a desired degree of conversion has been reached, the heat source (if used) can be removed; if the reaction vessel is to be reserved for polymerizations, the reaction mixture removed to a post-polymerization vessel for functionalization and/or quenching. At this point, the reaction mixture commonly is referred to as a "polymer cement" because of its relatively high concentration of polymer. Polymers made according to anionic techniques generally have a number average molecular weight ($M_n$) of up to ~500,000 Daltons. In certain embodiments, the $M_n$ can be as low as ~2000 Daltons; in these and/or other embodiments, the $M_n$ advantageously can be at least ~10,000 Daltons or can range from ~50,000 to ~250,000 Daltons or from ~75,000 to ~150,000 Daltons. Often, the $M_n$ is such that a quenched sample exhibits a gum Mooney viscosity ($ML_4/100°$ C.) of from ~2 to ~150, more commonly from ~2.5 to ~125, even more commonly from ~5 to ~100, and most commonly from ~10 to ~75.

The last unit to add to a polymer chain might be a B unit, in which case the polymer can be represented by general formula II in which Z can be a hydrogen atom or the radical of a terminating compound. Alternatively, a formula II-type polymer can be provided prior to quenching, advantageously when it is in the above-described polymer cement state. One method of effecting this functionalization involves introducing to the polymer cement one or more formula III compounds and allowing such compound(s) to react at a terminus of a reactive polymer chain. This type of compound hereinafter is referred to as an end-capping compound.

Where the end-capping compound includes more than one $OG_p$ substituent, each can be on the same phenyl ring, or two or more can be on different phenyl rings. A preferred group of end-capping compounds include those with one phenyl group having at least two $OG_p$ substituents and, optionally, one or more $OG_p$ substituents on the other phenyl ring.

Reaction of these types of compounds with a terminally active polymer can be performed relatively quickly (a few minutes to a few hours) at moderate temperatures (e.g., 0° to 75° C.). The amount of such compounds added to and reacted with the polymers can vary widely, depending significantly on the degree of desired effect, the amount of non-conventional filler(s) employed, the ratio of conventional-to-non-conventional filler particles, and the like. Based on the amount of reactive polymer chains (generally determined based on the equivalents of initiator or catalyst), the amount of formula III-type compound(s) can range from about 1:4 to about 5:4, generally from about 1:3 to about 9:8, and typically from about 1:2 to about 1:1. Lesser amounts can be employed in certain embodiments so as to preserve some reactive polymer terminals for reaction with other functionalizing agents, which can be added before, after, or with the compounds just discussed; this type of multiple functionalization can be avoided, at least to some extent, through use of functional initiators as discussed previously. Reacting the living polymer with any of a variety of quenching agents (discussed below) results in Z (from formula II) being a hydrogen atom, while reaction with a functionalizing agent results in the other option for Z.

Where a formula III-type end-capping compound is not employed but the macromolecule includes at least one functionalizing unit derived from either or both of a formula IV-type initiator and a formula III-type compound, the polymer can be further functionalized by reaction with a compound that includes one or more heteroatoms including, but not limited to, Sn, Si, and N, i.e., a terminating reagent, coupling agent and/or linking agent. The ordinarily skilled artisan is familiar with numerous examples of terminal functionalities that can be provided through this type of post-polymerization functionalization. For additional details, the interested reader is directed to any of U.S. Pat. Nos. 3,109,871, 4,015,061, 4,616,069, 4,647,625, 4,677,153, 4,935,471, 5,109,907, 5,153,159, 5,149,457, 5,196,138, 5,329,005, 5,496,940, 5,502,131, 5,567,815, 5,610,227, 5,663,398, 5,786,441, 6,812,295, 6,977,281, 7,153,919, etc., as well as references cited in these patents and later publications citing these patents; see also U.S. Patent Publ. Nos. 2007/0149744, 2007/0037956, 2007/0078232, 2008/0027171, and the like. Specific exemplary functionalizing compounds include $SnCl_4$, $R^2{}_3SnCl$, $R^2{}_2SnCl_2$, $R^2SnCl_3$, carbodiimides, N-cyclic amides, N,N'-disubstituted cyclic ureas, cyclic amides, cyclic ureas, isocyanates, Schiff bases, 4,4'-bis(diethylamino)benzophenone, alkyl thiothiazolines, alkoxysilanes (e.g., $Si(OR^2)_4$, $R^2Si(OR^2)_3$, $R^2{}_2Si(OR^2)_2$, etc.) cyclic siloxanes and mixtures thereof (In the foregoing, each $R^2$ independently is a $C_1$-$C_{20}$ alkyl group, $C_3$-$C_{20}$ cycloalkyl group, $C_6$-$C_{20}$ aryl group, or $C_7$-$C_{20}$ aralkyl group.) Specific examples of preferred functionalizing compounds include $SnCl_4$, tributyl tin chloride, dibutyl tin dichloride, 1,3-dimethyl-2-imidazolidinone (DMI), and 3-bis(trimethylsilyl) aminopropyl-methyldiethoxysilane.

Terminal functionality, if desired, can be provided to the living polymer while it remains in the polymerization vessel or, if desired, the polymer cement can be transferred to another vessel prior to reaction.

At this point, the resulting polymer includes one or more types of polyene mer and at least one functionalizing unit which includes a diphenylethylene group having at least one $OG_p$ substituent bonded to at least one of its phenyl rings. The functionalizing unit(s) can be derived from the initiating compound, the monomer(s), or an end-capping compound. In certain aspects, more than one of the functionalizing units can be incorporated, and these can result from multiple mer, from an initiator plus one or more mer, a terminal functionality plus one or more mer, or from all three.

The particular form of the substituent(s) bonded to the phenyl ring depends on the origin of the unit of which it is a part: units derived from an initiator and/or monomers will have $OG_p$ substituents while units derived from a terminating compound can have either type ($OG_p$ or OH). Ensuring that most, preferably all, $G_p$ moieties are converted to H atoms typically can be desirable so as to promote maximum interactivity with filler particles (when the polymer is used as part of a rubber composition). The processing steps (including quenching) described below can be sufficient to hydrolyze at least some of the $G_p$ moieties, thereby providing one or more hydroxyl substituents to one or more aryl groups within polymer. Alternatively, a separate reaction step designed to promote extensive, preferably complete, hydrolysis can be employed; from the exemplary technique employed in several of the examples below, the ordinarily skilled artisan can envision other potentially effective reactions. Further, the ordinarily skilled artisan understands that $OG_p$ or OH groups, regardless of location in the polymer chain, may undergo further reaction during this processing and/or compounding with one or more types of particulate fillers (described below).

Quenching, if desired, can be conducted by stirring the polymer and an active hydrogen-containing compound, such as an alcohol, water or an acid, for up to about 120 minutes at temperatures of from about 25° to about 150° C.

Solvent can be removed from the (quenched) polymer cement by conventional techniques such as drum drying, extruder drying, vacuum drying or the like, which may be combined with coagulation with water, alcohol or steam, thermal desolventization. If coagulation is performed, oven drying may be desirable.

Polymers and macromolecules such as those described above can display particularly advantageous properties when compounded with, inter alia, reinforcing fillers such as carbon black and silica. They can be utilized in a tread stock compound or can be blended with any conventionally employed tread stock rubber including natural rubber and/or non-functionalized synthetic rubbers such as, e.g., one or more of homo- and interpolymers that include just polyene-derived mer units (e.g., poly(butadiene), poly(isoprene), and copolymers incorporating butadiene, isoprene, and the like), SBR, butyl rubber, neoprene, ethylene/propylene rubber, ethylene/propylene/diene rubber, acrylonitrile/butadiene rubber, silicone rubber, fluoroelastomers, ethylene/acrylic rubber, ethylene/vinyl acetate interpolymer, epichlorohydrin rubbers, chlorinated polyethylene rubbers, chlorosulfonated polyethylene rubbers, hydrogenated nitrile rubber, tetrafluoroethylene/propylene rubber and the like. When a functionalized polymer(s) is blended with conventional rubber(s), the amounts can vary from about 5 to about 99% of the total rubber, with the conventional rubber(s) making up the balance of the total rubber. The minimum amount depends to a significant extent on the degree of hysteresis reduction desired.

Elastomeric compounds typically are filled to a volume fraction, which is the total volume of filler(s) added divided by the total volume of the elastomeric stock, often ~25%; typical (combined) amounts of reinforcing fillers range from about 30 to about 100 phr, with the upper end of the range being defined largely by how effectively processing equipment can handle the increased viscosities imparted when such fillers are employed.

Useful fillers include various forms of carbon black including, but not limited to, furnace black, channel blacks and lamp blacks. More specifically, examples of the carbon blacks include super abrasion furnace blacks, high abrasion furnace blacks, fast extrusion furnace blacks, fine furnace blacks, intermediate super abrasion furnace blacks, semi-reinforcing furnace blacks, medium processing channel blacks, hard processing channel blacks, conducting channel blacks, and acetylene blacks; mixtures of two or more of these can be used. Carbon blacks having a surface area (EMSA) of at least 20 $m^2/g$, preferably at least about 35 $m^2/g$, are preferred; see ASTM D-1765 for methods of determining surface areas of carbon blacks. The carbon blacks may be in pelletized form or an unpelletized flocculent mass, although unpelletized carbon black can be preferred for use in certain mixers.

The amount of carbon black can be up to about 50 phr, with about 5 to about 40 phr being typical.

Amorphous silica ($SiO_2$) also can be utilized as a filler. Silicas are generally classified as wet-process, hydrated silicas because they are produced by a chemical reaction in water, from which they are precipitated as ultrafine, spherical particles. These primary particles strongly associate into aggregates, which in turn combine less strongly into agglomerates. "Highly dispersible silica" is any silica having a very substantial ability to de-agglomerate and to disperse in an elastomeric matrix, which can be observed by thin section microscopy.

Surface area gives a reliable measure of the reinforcing character of different silicas; the Brunauer, Emmet and Teller ("BET") method (described in *J. Am. Chem. Soc.*, vol. 60, p. 309 et seq.) is a recognized method for determining surface area. BET surface areas of silicas generally are less than 450 $m^2/g$, commonly from ~32 to ~400 $m^2/g$ or from ~100 to ~250 $m^2/g$ or from ~150 to ~220 $m^2/g$.

The pH of the silica filler (when used) is generally from about 5 to about 7 or slightly over, preferably from about 5.5 to about 6.8.

Commercially available silicas include various grades of Hi-Sil™ powdered and granular silicas (PPG Industries, Inc.; Pittsburgh, Pa.). Other suppliers of commercially available silica include Grace Davison (Baltimore, Md.), Degussa Corp. (Parsippany, N.J.), Rhodia Silica Systems (Cranbury, N.J.), and J.M. Huber Corp. (Edison, N.J.).

When silica is employed, a coupling agent such as a silane often is added so as to ensure good mixing in, and interaction with, the elastomer(s). Generally, the amount of silane that is added ranges between ~4 and 20%, based on the weight of silica filler present in the elastomeric compound. Coupling agents can have a general formula of A-T-G, in which A represents a functional group capable of bonding physically and/or chemically with a group on the surface of the silica filler (e.g., surface silanol groups); T represents a hydrocarbon group linkage; and G represents a functional group capable of bonding with the elastomer (e.g., via a sulfur-containing linkage). Such coupling agents include organosilanes, in particular polysulfurized alkoxysilanes (see, e.g., U.S. Pat. Nos. 3,873,489, 3,978,103, 3,997,581, 4,002,594, 5,580,919, 5,583,245, 5,663,396, 5,684,171, 5,684,172, 5,696,197, etc.) or polyorganosiloxanes bearing the G and A functionalities mentioned above. Addition of a processing aid can be used to reduce the amount of silane employed. See, e.g., U.S. Pat. No. 6,525,118 for a description of fatty acid esters of sugars used as processing aids. Additional fillers useful as processing aids include, but are not limited to, mineral fillers, such as clay (hydrous aluminum silicate), talc (hydrous magnesium silicate), and mica as well as non-mineral fillers such as urea and sodium sulfate. Exemplary micas contain principally alumina, silica and potash, although other variants can be used. Additional fillers can be utilized in an amount of up to ~40 phr, typically up to ~20 phr.

Silica commonly is employed in amounts up to ~100 phr, typically in an amount from ~5 to ~80 phr. When carbon black also is present, the amount of silica can be decreased to as low as ~1 phr; as the amount of silica decreases, lesser amounts of the processing aids, plus silane if any, can be employed.

One or more non-conventional fillers having relatively high interfacial free energies, i.e., surface free energy in water values ($\gamma_{pl}$) preferably are used in conjunction with or in place of carbon black and/or silica. The term "relatively high" can be defined or characterized in a variety of ways such as, e.g., greater than that of the water-air interface, preferably several multiples (e.g., at least 2×, at least 3× or even at least 4×) of this value; at least several multiples (e.g., at least 2×, at least 3×, at least 4×, at least 5×, at least 6×, at least 7×, at least 8×, at least 9× or even at least 10×) of the $\gamma_{pl}$ value for amorphous silica; in absolute terms such as, e.g., at least ~300, at least ~400, at least ~500, at least ~600, at least ~700, at least ~750, at least ~1000, at least ~1500, and at least ~2000 mJ/m$^2$; and in ranges such as, e.g., from ~300 to ~5000 mJ/m$^2$, from ~350 to ~4000 mJ/m$^2$, from ~400 to ~5000 mJ/m$^2$, from ~450 to ~4000 mJ/m$^2$, from ~500 to ~5000 mJ/m$^2$, as well as various sub-ranges.

Non-limiting examples of naturally occurring materials with relatively high interfacial free energies include F-apatite, goethite, hematite, zincite, tenorite, gibbsite, quartz, kaolinite, all forms of pyrite, and the like. Certain synthetic complex oxides also can exhibit this type of high interfacial free energy.

The foregoing types of materials typically are more dense than either carbon black or amorphous silica; thus, replacing a particular mass of carbon black or silica with an equal mass of a non-conventional filler typically will result in a much smaller volume of overall filler being present in a given compound. Accordingly, replacement typically is made on an equal volume, as opposed to equal weight, basis. (This weight inequality issue might be able to be overcome or ameliorated by employing non-standard particles such as, e.g., hollow particles of one or more types of non-conventional fillers as well as relatively lighter particles coated so as to have a surface that includes one or more of types of non-conventional filler compounds.) Generally, ~5 to ~60% of the conventional particulate filler material(s) can be replaced with an approximately equivalent (~0.8× to ~1.2×) volume of non-conventional filler particles. In certain embodiments, replacing ~10 to ~58% of the conventional particulate filler material(s) with an approximately equivalent (~0.85× to ~1.15×) volume of other filler particles is sufficient; in other embodiments, replacing ~15 to ~55% of the conventional particulate filler material(s) with an approximately equivalent (~0.9× to ~1.1×) volume of other filler particles is adequate; in still other embodiments, replacing ~18 to ~53% of the conventional particulate filler material(s) with an approximately equivalent (~0.95× to ~1.05×) volume of other filler particles can be preferable.

The non-conventional filler particles generally can be of approximately the same size as the conventional fillers employed in compounds. In other words, neither extremely large particles such as those employed in the aforementioned U.S. Pat. No. 5,066,702 nor extremely small particles such as those employed in the aforementioned U.S. Pat. No. 6,972,307 are required. In general, particles with relatively small diameters are preferred both for reinforcement purposes and to ensure a large number of particles are available at the tread surface.

Other conventional rubber additives also can be added. These include, for example, process oils, plasticizers, anti-degradants such as antioxidants and antiozonants, curing agents and the like.

All ingredients can be mixed with standard equipment such as, e.g., Banbury or Brabender mixers. Typically, mixing occurs in two or more stages. During the first stage (often referred to as the masterbatch), mixing typically is begun at temperatures of ~120° to ~130° C. and increases until a so-called drop temperature, typically ~165° C., is reached.

Where a formulation includes fillers other than or in addition to carbon black, a separate re-mill stage can be employed for separate addition of the silane component(s). This stage often is performed at temperatures similar to, although often slightly lower than, those employed in the masterbatch stage, i.e., ramping from ~90° C. to a drop temperature of ~150° C.

Reinforced rubber compounds conventionally are cured with ~0.2 to ~5 phr of one or more known vulcanizing agents such as, for example, sulfur or peroxide-based curing systems. For a general disclosure of suitable vulcanizing agents, see Kirk-Othmer, *Encyclopedia of Chem. Tech.*, 3d ed., (Wiley Interscience, New York, 1982), vol. 20, pp. 365-468. Vulcanizing agents, accelerators, etc., are added at a final mixing stage. To reduce the chances of undesirable scorching and/or premature onset of vulcanization, this mixing step often is done at lower temperatures, e.g., starting at ~60° to ~65° C. and not going higher than ~105° to ~110° C.

Subsequently, the compounded mixture is processed (e.g., milled) into sheets prior to being formed into any of a variety of components and then vulcanized, which typically occurs at ~5° to ~15° C. higher than the highest temperatures employed during the mixing stages, most commonly ~170° C.

The following non-limiting, illustrative examples provide the reader with detailed conditions and materials that can be useful in the practice of the present invention.

EXAMPLES

In the examples, dried glass vessels previously sealed with extracted septum liners and perforated crown caps under a positive $N_2$ purge were used for all preparations. Butadiene solutions (in hexane), styrene (34.5% by wt. in hexane), hexane, n-butyllithium (in hexane), 2,2-bis(2'-tetrahydrofuryl) propane solution (1.6 M solution in hexane, stored over $CaH_2$), and butylated hydroxytoluene (BHT) solution in hexane were used.

from Sigma-Aldrich Co. (St. Louis, Mo.)—3,4-dihydroxybenzophenone (97%), triethylamine (99.5%), 3,4-dihydroxybenzaldehyde (97%), 2,5-dihydroxybenzaldehyde (98%), 3',5'-dihydroxyacetophenone (97%), methyltriphenylphosphonium bromide (98%), 1-(3-bromopropyl)-2,2,5,5-tetramethyl-1-aza-2,5-disilacyclopentane (97%), and 4-di(methylamino)pyridine (DMAP, 99%); and from ACROS Organics (Geel, Belgium)—tert-butyldimethylsilyl chloride (98%) and tetrabutylammonium fluoride (TBAF, 1M in THF containing ~5% water).

Testing data in the Examples was performed on filled compositions made according to the formulations shown in Tables 1a (a formulation employing only carbon black as a particulate filler) and 1b (a formulation employing only silica as a particulate filler). In these tables, N-phenyl-N'-(1,3-dimethylbutyl)-p-phenyldiamine acts as an antioxidant while 2,2'-dithiobisbenzothiazole, N-t-butylbenzothiazole-2-sulfenamide, and N,N'-diphenylguanidine act as accelerators.

TABLE 1a

Composition for vulcanizates, carbon black filler

| Masterbatch | Amount (phr) |
|---|---|
| polymer | 100 |
| carbon black (N343 type) | 50 |
| wax | 2 |
| N-phenyl-N'-(1,3-dimethylbutyl)-p-phenylenediamine | 0.95 |
| stearic acid | 2 |
| processing oil (low PCA content) | 10 |
| Final | |
| sulfur | 1.5 |
| N-cyclohexylbenzothiazole-2-sulfenamide | 0.5 |
| N,N'-diphenylguanidine | 0.3 |
| 2,2'-dithiobisbenzothiazole | 0.5 |
| ZnO | 2.5 |
| TOTAL | 170.25 |

TABLE 1b

Composition for vulcanizates, silica filler

| Masterbatch | Amount (phr) |
|---|---|
| synthesized polymer | 80 |
| poly(isoprene) (natural rubber) | 20 |
| silica | 52.5 |
| wax | 2 |
| N-phenyl-N'-(1,3-dimethylbutyl)-p-phenyldiamine | 0.95 |
| stearic acid | 2 |
| processing oil (low PCA content) | 10 |
| Re-mill | |
| silica | 2.5 |
| silane | 5 |
| Final | |
| sulfur | 1.5 |
| ZnO | 2.5 |
| 2,2'-dithiobisbenzothiazole | 2.0 |
| N-t-butylbenzothiazole-2-sulfenamide | 0.7 |
| N,N'-diphenylguanidine | 1.4 |
| TOTAL | 183.05 |

Data corresponding to "60° C. Dynastat tan δ" were acquired from tests conducted on a Dynastat™ mechanical spectrometer (Dynastatics Instruments Corp.; Albany, N.Y.) using the following conditions: 1 Hz, 2 kg static mass and 1.25 kg dynamic load, a cylindrical (9.5 mm diameter×16 mm height) vulcanized rubber sample, and 60° C.

Data corresponding to "Bound rubber" were determined using the procedure described by J. J. Brennan et al., *Rubber Chem. and Tech.*, 40, 817 (1967).

Cold flow testing was performed using a Scott™ tester. Samples were prepared by melt pressing 2.5 g of polymer at 100° C. for 20 minutes in a mold using a preheated press. The resulting cylindrical samples, which had a uniform thickness of ~12 mm, were allowed to cool to room temperature before being removed from the mold. Samples were placed individually under the weight of a 5 kg calibrated weight. Tests were conducted for ~30 minutes (measured from time that the weight was released), with sample thicknesses being recorded as a function of time. Sample thickness at the conclusion of the appropriate time generally is considered to be an acceptable indicator of cold flow resistance.

Mooney viscosity ($ML_{1+4}$) values were determined with an Alpha Technologies™ Mooney viscometer (large rotor) using a one-minute warm-up time and a four-minute running time; tensile mechanical properties were determined using the standard procedure described in ASTM-D412; Payne effect ($\Delta G'$, i.e., the difference between G' at 0.25% strain and at 14% strain) and hysteresis (tan δ) data were obtained from dynamic experiments conducted at 60° C. and 10 Hz (strain sweep) and 2% strain and 10 Hz (temperature sweep). With respect to tensile properties, $M_X$ is modulus at X % elongation, $T_b$ is tensile strength at break, and $E_b$ is percent elongation at break.

Examples 1-4

Synthesis of Benzophenones and Benzaldehydes

To a dry flask under nitrogen was added ~6.0 g 3,4-dihydroxybenzophenone and ~0.14 g DMAP, followed by ~100 mL DMF to provide a solution. After 8.6 mL triethylamine was added, a solution of ~20.5 mL tert-butyldimethylsilyl chloride (3.0 M in THF) was added dropwise. The resulting suspension was stirred for ~1 hour at room temperature before ~200 mL hexane and ~50 mL of a saturated aqueous solution of $NH_4Cl$ were added. The organic phase was washed three times with ~100 mL water. The residue was purified by silica gel column chromatography (200-425 mesh from Fisher Scientific) with hexane/ethyl acetate (85:15, v/v) as eluent. After solvent was removed, a colorless solid was obtained (93% yield). Proton and $^{13}C$ NMR spectroscopic analysis (Varian™ 300 MHz spectrophotometer) confirmed the product as 3-bis(tert-butyldimethylsiloxyl)benzophenone [3-(TBDMSO)BP, Example 1].

Similar procedures were used to make 3,4-bis(tert-butyldimethylsiloxyl)benzaldehyde [3,4-(TBDMSO)BA, Example 2] (98%, off-white solid) from 3,4-dihydroxybenzaldehyde, 2,5-bis(tert-butyldimethylsiloxyl)benzaldehyde [2,5-(TBDMSO)BA, Example 3] (90%, colorless oil) from 2,5-dihydroxybenzaldehyde, and 3',5'-bis(tert-butyldimethylsiloxyl)acetophenone [3',5'-(TBDMSO)AP, Example 3] (90%, colorless oil) from 3',5'-dihydroxyacetophenone.

Example 5

Synthesis of Phenylethylene Compound

To 40.0 g methyltriphenylphosphonium bromide in 130 mL THF was added 47.2 mL 1.6 M n-butyllithium solution at 0° C., which resulted in formation of an orange suspension. After ~20 minutes, 41.4 g 3,4-(TBDMSO)BP (from Example 1) in 120 mL THF was slowly cannulated to the suspension, resulting in formation of a yellow suspension which was stirred overnight at room temperature. After solid was filtered out and solvent removed, raw product was purified by silica gel column chromatography with hexane/ethyl acetate (95:5, v/v), yielding 38.0 g colorless oil (92.3% yield). Proton and $^{13}C$ NMR spectroscopic analysis confirmed the product as 1-[3,4-bis(tert-butyldimethylsiloxyl)phenyl]-1-phenylethylene [3,4-(TBDMSO)DPE].

Examples 6-14

Styrene/Butadiene Copolymers

To a $N_2$-purged reactor equipped with a stirrer was added 1.52 kg hexane, 0.37 kg styrene solution, and 2.33 kg butadiene solution (22.0 wt. % in hexane). The reactor was charged with 3.14 mL 1.7 M n-butyllithium solution, followed by 1.17 mL 2,2-bis(2'-tetrahydrofuryl)propane solution. The reactor jacket was heated to 50° C., and the polymerization was allowed to proceed for ~75 minutes. After the polymer cement was cooled to room temperature, it was dropped into isopropanol containing BHT and drum dried. Properties of this unmodified control polymer (Example 6) are summarized below in Table 2.

To another $N_2$-purged reactor equipped with a stirrer was added 1.60 kg hexane, 0.37 kg styrene solution, and 2.33 kg butadiene solution (22.8% by wt. in hexane). The reactor was charged with a separately prepared initiator solution, which included 3.75 mL of a 1.42 M solution of sec-butyllithium in hexane, 5.06 mL of a 1.0 M solution of 3,4-(TBDMSO)DPE (from Example 5) in hexane and 1.17 mL 2,2-bis(2'-tetrahydrofuryl)propane solution. The reactor jacket was heated to 50° C., and the polymerization was allowed to proceed for ~75 minutes. After the polymer cement was cooled to room temperature, portions were dropped into dried bottles and treated as follows:

- Ex. 7 terminated with isopropanol followed by addition of TBAF solution (~5:2 molar ratio relative to initiator) to hydrolyze protecting groups
- Ex. 8 addition of 1.0 M 3,4-(TBDMSO)DPE (from Example 5) in hexane (~1:1 molar ratio relative to initiator), agitation for ~30 min. at 50° C., addition of TBAF solution (~5:1 molar ratio relative to initiator) to hydrolyze protecting groups
- Ex. 9 addition of 1-(3-bromopropyl)-2,2,5,5-tetramethyl-1-aza-2,5-disilacyclopentane in hexane (~1:1 molar ratio relative to initiator), agitation for ~30 min. at 50° C., addition of TBAF solution (~5:2 molar ratio relative to initiator) to hydrolyze protecting groups
- Ex. 10 addition of 1.0 M 3,4-(TBDMSO)DPE (from Example 5) in hexane (~1:1 molar ratio relative to initiator), agitation for ~30 min. at 50° C., addition of 1-(3-bromopropyl)-2,2,5,5-tetramethyl-1-aza-2,5-disilacyclopentane in hexane (~1:1 molar ratio relative to initiator), addition of TBAF solution (~5:1 molar ratio relative to initiator) to hydrolyze protecting groups
- Ex. 11 addition of a solution of 3,4-(TBDMSO)BA (from Example 2) in hexane (~1:1 molar ratio relative to initiator), agitation for ~30 min. at 50° C., addition of TBAF solution (~5:1 molar ratio relative to initiator) to hydrolyze protecting groups
- Ex. 12 addition of a solution of 2,5-(TBDMSO)BA (from Example 3) in hexane (~1:1 molar ratio relative to initiator), agitation for ~30 min. at 50° C., addition of TBAF solution (~5:1 molar ratio relative to initiator) to hydrolyze protecting groups
- Ex. 13 addition of a solution of 3,4-(TBDMSO)BP (from Example 1) in hexane (~1:1 molar ratio relative to initiator), agitation for ~30 min. at 50° C., addition of TBAF solution (~5:1 molar ratio relative to initiator) to hydrolyze protecting groups
- Ex. 14 addition of a solution of 3',5'-(TBDMSO)AP (from Example 4) in hexane (~1:1 molar ratio relative to initiator), agitation for ~30 min. at 50° C., addition of TBAF solution (~5:1 molar ratio relative to initiator) to hydrolyze protecting groups Each of the sample bottles were rotated in a 25° C. bath for ~2 hours before each cement was coagulated with isopropanol containing BHT and drum dried. The properties of these functionalized polymers are provided below in Table 2, where $M_p$ represents peak molecular weight and 1,2-microstructure percentages are based on total amount of butadiene employed.

TABLE 2

| | Polymer properties | | | | | | | | |
|---|---|---|---|---|---|---|---|---|---|
| | 6 | 7 | 8 | 9 | 10 | 11 | 12 | 13 | 14 |
| $M_n$ (kg/mol) | 109 | 113 | 113 | 128 | 126 | 113 | 174 | 115 | 113 |
| $M_w/M_n$ | 1.04 | 1.10 | 1.09 | 1.23 | 1.23 | 1.08 | 4.66* | 1.12 | 1.08 |
| $M_p$ (kg/mol) | 114 | 112 | 114 | 114 | 114 | 115 | 116 | 113 | 115 |
| $T_g$ (° C.) | −34.1 | −33.5 | −33.3 | −32.7 | −33.1 | −33.3 | −32.8 | −33.5 | −33.4 |
| coupling (%) | 1.5 | 10.0 | 8.1 | 37.7 | 27.9 | 6.6 | 52.2 | 11.5 | 6.4 |
| Total styrene (%) | 21.1 | 21.4 | 21.4 | 21.4 | 21.4 | 21.3 | 21.3 | 21.4 | 21.3 |
| 1,2-microstructure (%) | 53.8 | 54.1 | 54.1 | 54.1 | 54.1 | 54.6 | 54.6 | 54.1 | 54.6 |
| Cold flow (mm) | 1.99 | 2.73 | 4.18 | 3.80 | 5.11 | 5.06 | 5.31 | 3.99 | 5.86 |

*High polydispersity index value likely due to coupling.

Examples 15-32

Preparation and Testing of Vulcanizates

Using the formulation from Tables 1a and 1b above, rubber compounds containing reinforcing fillers were prepared from Examples 6-14. Compounds were cured for 15 min. at 171° C. to provide vulcanizates 15-23 (carbon black) and 24-32 (silica), respectively.

Results of physical testing on vulcanizates made from these polymers are summarized below in Tables 3 and 4; for the "Temp. sweep" line, the top row of data are from measurements at 0° C. while the bottom row are from measurements at 60° C.

The data from these tables show that formula I-type functional SBR interpolymers exhibit excellent interaction with carbon black and silica filler as evidenced by decrease in high temperature tan δ, reduction in ΔG', increased low temperature tan δ, etc.

Detailed strain sweep test results (tan δ) also were collected. The general trend in the results was as follows:

carbon black: 15<16<<22<17<23<21<18<19<20
silica: 24<25<<26<27<30≈31<28≈32<29

TABLE 3

Compound and vulcanizate properties, Examples 15-23 (carbon black)

|  | 15 | 16 | 17 | 18 | 19 | 20 | 21 | 22 | 23 |
|---|---|---|---|---|---|---|---|---|---|
| synthetic polymer (example no.) | 6 | 7 | 8 | 9 | 10 | 11 | 12 | 13 | 14 |
| Bound rubber (%) | 8.7 | 17.0 | 24.7 | 39.0 | 34.7 | 30.4 | 36.7 | 24.0 | 26.8 |
| MDR2000 @ 171° C. (final) | | | | | | | | | |
| ML (kg·cm) | 0.75 | 0.94 | 1.04 | 1.96 | 1.48 | 1.30 | 1.80 | 0.95 | 1.11 |
| MH (kg·cm) | 16.37 | 16.99 | 17.55 | 16.12 | 16.66 | 17.05 | 16.29 | 17.92 | 18.04 |
| $t_{50}$ (min) | 2.83 | 1.94 | 1.36 | 1.44 | 1.31 | 1.24 | 1.34 | 1.33 | 1.35 |
| $t_{90}$ (min) | 8.32 | 9.69 | 11.19 | 9.86 | 11.24 | 11.32 | 10.40 | 11.42 | 11.77 |
| Compound $ML_{1+4}$ @ 130° C. (final) | 17.6 | 24.4 | 38.4 | 59.3 | 51.8 | 50.9 | 53.2 | 36.5 | 47.1 |
| Dynatstat ™ tan δ @ 60° C. (final) | 0.2176 | 0.1875 | 0.1195 | 0.1082 | 0.1024 | 0.0974 | 0.1154 | 0.1272 | 0.1156 |
| Tensile @ 23° C. (final, unaged) | | | | | | | | | |
| $M_{50}$ (MPa) | 1.36 | 1.36 | 1.27 | 1.26 | 1.26 | 1.31 | 1.21 | 1.43 | 1.39 |
| $M_{300}$ (MPa) | 9.64 | 8.28 | 6.93 | 10.36 | 10.45 | 9.83 | 10.46 | 9.75 | 10.10 |
| $T_b$ (MPa) | 18.9 | 16.9 | 16.2 | 21.0 | 17.2 | 19.2 | 18.5 | 17.6 | 19.0 |
| $E_b$ (%) | 493 | 517 | 574 | 498 | 424 | 483 | 450 | 466 | 478 |
| Tensile @ 100° C. (final, unaged) | | | | | | | | | |
| $M_{50}$ (MPa) | 1.1 | 1.0 | 0.9 | 1.0 | 1.0 | 1.1 | 1.0 | 1.1 | 1.1 |
| $M_{200}$ (MPa) | 4.8 | 4.3 | 3.6 | 5.0 | 5.0 | 4.8 | 5.0 | 4.9 | 5.0 |
| $T_b$ (MPa) | 8.8 | 8.2 | 8.5 | 9.3 | 10.2 | 9.8 | 10.3 | 9.2 | 9.2 |
| $E_b$ (%) | 311 | 329 | 391 | 304 | 323 | 333 | 326 | 317 | 304 |
| Strain sweep (60° C., 10 Hz, final) | | | | | | | | | |
| G' @ 5% strain (MPa) | 2.91 | 2.62 | 2.36 | 2.12 | 2.24 | 2.22 | 2.28 | 2.43 | 2.45 |
| G" @ 5% strain (MPa) | 0.68 | 0.55 | 0.31 | 0.24 | 0.25 | 0.23 | 0.27 | 0.34 | 0.30 |
| tan δ @ 5% strain | 0.2329 | 0.2082 | 0.1316 | 0.1147 | 0.1117 | 0.1042 | 0.1184 | 0.1386 | 0.1239 |
| ΔG' (MPa) | 3.78 | 2.58 | 0.98 | 0.66 | 0.70 | 0.62 | 0.81 | 1.22 | 1.03 |
| Temp. sweep (2% strain, 10 Hz, final) | | | | | | | | | |
| G' (MPa) | 15.11 | 14.29 | 12.06 | 8.43 | 9.10 | 9.49 | 8.51 | 12.92 | 11.07 |
|  | 5.22 | 5.04 | 4.71 | 3.38 | 3.64 | 3.82 | 3.48 | 4.73 | 4.27 |
| G" (MPa) | 6.02 | 6.08 | 5.11 | 3.84 | 4.07 | 4.11 | 3.84 | 5.40 | 4.67 |
|  | 1.24 | 1.11 | 0.77 | 0.42 | 0.47 | 0.50 | 0.43 | 0.84 | 0.66 |
| tan δ | 0.3978 | 0.4246 | 0.4228 | 0.4559 | 0.4451 | 0.4322 | 0.4506 | 0.4168 | 0.4211 |
|  | 0.2378 | 0.2205 | 0.1639 | 0.1250 | 0.1304 | 0.1322 | 0.1250 | 0.1775 | 0.1544 |

TABLE 4

Compound and vulcanizate properties, Examples 24-32 (silica)

|  | 24 | 25 | 26 | 27 | 28 | 29 | 30 | 31 | 32 |
|---|---|---|---|---|---|---|---|---|---|
| synthetic polymer (example no.) | 6 | 7 | 8 | 9 | 10 | 11 | 12 | 13 | 14 |
| Bound rubber (%) | 20.8 | 24.8 | 29.6 | 32.0 | 37.7 | 34.5 | 37.0 | 33.2 | 30.9 |
| MDR2000 @ 171° C. (final) | | | | | | | | | |
| ML (kg·cm) | 1.32 | 1.19 | 0.97 | 1.78 | 1.35 | 1.21 | 2.16 | 1.00 | 1.08 |
| MH (kg·cm) | 22.13 | 20.98 | 20.94 | 20.95 | 20.17 | 19.02 | 20.69 | 19.71 | 20.64 |
| $t_{50}$ (min) | 2.38 | 2.19 | 1.60 | 1.80 | 1.68 | 1.50 | 1.87 | 1.54 | 1.67 |
| $t_{90}$ (min) | 5.91 | 4.72 | 3.70 | 3.65 | 3.99 | 3.49 | 4.34 | 3.60 | 4.19 |
| Compound $ML_{1+4}$ @ 130° C. (final) | 14.1 | 19.7 | 29.2 | 46.5 | 41.7 | 42.6 | 50.5 | 33.0 | 33.5 |
| Dynatstat ™ tan δ @ 60° C. (final) | 0.1441 | 0.1206 | 0.0772 | 0.0734 | 0.0672 | 0.0567 | 0.0728 | 0.0717 | 0.0677 |
| Tensile @ 23° C. (final, unaged) | | | | | | | | | |
| $M_{50}$ (MPa) | 1.58 | 1.47 | 1.56 | 1.45 | 1.35 | 1.30 | 1.39 | 1.40 | 1.41 |
| $M_{300}$ (MPa) | 8.19 | 8.71 | 9.93 | 9.39 | 9.71 | 9.64 | 9.35 | 9.75 | 9.73 |
| $T_b$ (MPa) | 14.3 | 15.3 | 13.9 | 16.2 | 16.7 | 16.3 | 12.8 | 16.7 | 15.3 |
| $E_b$ (%) | 471 | 462 | 389 | 445 | 446 | 438 | 375 | 445 | 441 |
| Tensile @ 100° C. (final, unaged) | | | | | | | | | |
| $M_{50}$ (MPa) | 1.3 | 1.4 | 1.4 | 1.4 | 1.4 | 1.3 | 1.2 | 1.4 | 1.3 |
| $M_{200}$ (MPa) | 4.6 | 5.0 | 5.5 | 5.4 | 5.6 | 5.3 | 4.9 | 5.6 | 5.4 |
| $T_b$ (MPa) | 6.7 | 7.6 | 6.9 | 6.1 | 7.7 | 6.9 | 7.9 | 8.1 | 7.4 |
| $E_b$ (%) | 285 | 289 | 243 | 222 | 261 | 244 | 295 | 270 | 261 |
| Strain sweep (60° C., 10 Hz, final) | | | | | | | | | |
| G' @ 5% strain (MPa) | 3.85 | 3.18 | 2.80 | 2.77 | 2.47 | 2.36 | 2.80 | 2.44 | 2.32 |
| G" @ 5% strain (MPa) | 0.63 | 0.47 | 0.28 | 0.26 | 0.21 | 0.18 | 0.25 | 0.22 | 0.19 |

TABLE 4-continued

Compound and vulcanizate properties, Examples 24-32 (silica)

|  | 24 | 25 | 26 | 27 | 28 | 29 | 30 | 31 | 32 |
|---|---|---|---|---|---|---|---|---|---|
| tan δ @ 5% strain | 0.1631 | 0.1469 | 0.0995 | 0.0950 | 0.0843 | 0.0749 | 0.0884 | 0.0904 | 0.0826 |
| ΔG' (MPa) | 4.48 | 2.93 | 1.46 | 1.33 | 0.84 | 0.68 | 1.13 | 0.93 | 0.68 |
| Temp. sweep (2% strain, 10 Hz, final) | | | | | | | | | |
| G' (MPa) | 16.39 | 15.25 | 12.87 | 12.22 | 11.05 | 9.32 | 10.37 | 11.73 | 12.53 |
|  | 8.38 | 7.11 | 5.97 | 5.71 | 5.20 | 4.41 | 4.84 | 5.36 | 5.79 |
| G" (MPa) | 5.50 | 5.83 | 5.49 | 5.18 | 4.88 | 4.30 | 4.44 | 5.19 | 5.48 |
|  | 1.07 | 0.93 | 0.65 | 0.54 | 0.47 | 0.36 | 0.42 | 0.54 | 0.56 |
| tan δ | 0.3325 | 0.3782 | 0.4209 | 0.4181 | 0.4352 | 0.4541 | 0.4224 | 0.4359 | 0.4311 |
|  | 0.1276 | 0.1303 | 0.1080 | 0.0948 | 0.0906 | 0.0814 | 0.0865 | 0.1000 | 0.0973 |

That which is claimed is:

1. A method for providing a functionalized polymer comprising providing an initiator having the general formula

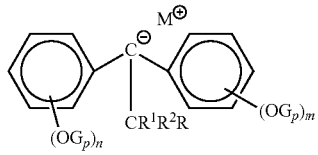

where
M is an alkali metal atom,
R is a hydrocarbyl group,
each $G_p$ independently is a protecting group,
each of $R^1$ and $R^2$ independently is a hydrogen atom or a hydrocarbyl group,
m is an integer of from 2 to 5 inclusive, and
n is an integer of from 0 to 5 inclusive; and
introducing said initiator to, or introducing to said initiator, ethylenically unsaturated monomers that comprise at least one polyenes and one or more types of vinyl aromatic compounds, thereby providing said functionalized polymer, the radical of said initiator constituting one end of the chain of said functionalized polymer and said functionalized polymer having random microstructure.

2. The method of claim 1 wherein said ethylenically unsaturated monomers comprise at least one conjugated diene.

3. The method of claim 1 wherein said initiator is provided by reacting a hydrocarbyl alkali metal compound with a compound having the general formula

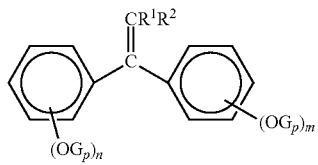

where
each $G_p$ independently is a protecting group,
each of $R^1$ and $R^2$ independently is a hydrogen atom or a hydrocarbyl group,
m is an integer of from 2 to 5 inclusive, and
n is an integer of from 0 to 5.

4. The method of claim 1 wherein said 2 $OG_p$ groups are bonded to adjacent C atoms of the phenyl ring.

5. The method of claim 1 further comprising reacting said functionalized polymer with a compound comprising one or more heteroatoms.

6. The process of claim 3 wherein each of $R^1$ and $R^2$ is a hydrocarbyl group that is free of ethylenic unsaturation.

7. The process of claim 6 wherein each of $R^1$ and $R^2$ is a $C_1$-$C_6$ alkyl group.

8. The process of claim 3 wherein each of $R^1$ and $R^2$ is a hydrogen atom.

9. The process of claim 3 wherein said hydrocarbyl alkali metal compound is an alkyllithium compound selected from N-lithio-hexamethyleneimine, n-butyllithium, tributyltin lithium, dialkylaminolithium compounds, dialkylaminoalkyllithium compounds and trialkylstanyl lithium compounds that comprise $C_1$-$C_{12}$ alkyl groups.

10. The process of claim 1 wherein said functionalized polymer comprises from about 20 to about 40% mer derived from said at least one vinyl aromatic compounds.

11. The process of claim 1 wherein said functionalized polymer comprises from about 10% to about 80% 1,2-microstructure, based on total number of polyene mer.

12. The process of claim 11 wherein said functionalized polymer comprises from about 25% to about 65% 1,2-microstructure, based on total number of polyene mer.

13. The process of claim 1 wherein said functionalized polymer comprises no more than 50% 1,2-microstructure, based on total number of polyene mer.

14. The process of claim 4 wherein said 2 OGp groups are bonded to the carbon atoms at the 3 and 4 positions of the phenyl ring.

15. The process of claim 1 wherein said functionalized polymer has a number average molecular weight of from about 75,000 to about 150,000 Daltons.

* * * * *